Patented Apr. 9, 1929.

1,708,563

UNITED STATES PATENT OFFICE.

JOHN C. BLACK, OF DESTREHAN, LOUISIANA, AND WIRT D. RIAL, OF LOS ANGELES COUNTY, AND JOHN R. McCONNELL, OF WHITTIER, CALIFORNIA, ASSIGNORS TO PAN AMERICAN PETROLEUM COMPANY, OF LOS ANGELES, CALIFORNIA, A CORPORATION OF CALIFORNIA.

PROCESS OF IMPARTING FLUORESCENCE TO OIL.

No Drawing.     Application filed October 13, 1926.   Serial No. 141,423.

The invention of this application is directed to a method of imparting a desired fluorescence to an oil.

It is well known that oils, particularly petroleum oils, such as lubricating oils, frequently possess blue fluorescence. This blue fluorescence is found undesirable from a marketing point of view. The trade has associated green fluorescence with quality. The presence of the blue fluorescence is therefore considered a mark of an inferior oil, although as a matter of fact the oil with the blue fluorescence may have equal or superior qualities to an oil with green fluorescence. It is therefore desirable, from a commercial point of view, to manufacture oils containing this preferred green fluorescence. It is an object of this invention to impart a green fluorescence to an oil which, when made by ordinary manufacturing methods will have a fluorescence other than green, as for instance, a blue fluorescence.

We have found that certain bodies on solution in the oil will impart to the oil a green fluorescence without in any way deleteriously affecting the quality of the finished oil. We have found, for instance, that these bodies are present in pitches formed from carbonaceous materials, and especially formed by the distillation of carbonaceous materials. They are found, for instance, in coal tar pitches, pitches formed from petroleum oils, water gas tar pitches, lignite pitches, and shale oil pitches. Apparently these bodies are high boiling bodies and concentrate in these pitches and are removable only at very high temperatures.

The process of this application consists broadly in concentrating these fluorescent bodies, as for instance, by forming these pitches and treating the oil with the concentrated fluorescent material. It is an important advantage of this process that by using a concentrated fluorescent material only a very small amount of impurities associated with the fluorescent materials are introduced into the oil.

For the purposes of this application the term "pitch" includes the residuums formed by the distillation of carbonaceous materials, which residuums are solid, or substantially solid, at ordinary temperatures. This term also comprehends the highly boiling, highly viscous fractions obtained by the coking distillation of these pitches. These pitches are usually formed as a result of a high temperature distillation which may include decomposition or may be under conditions in which decomposition is avoided. If the distillation is carried on at a sufficiently high temperature at requisite reduced pressures, it will be found that the product will not be actually solid at ordinary temperatures, and solidifies at temperatures slightly below the normal temperature. The distillates obtained from such a distillation may contain fluorescent bodies.

We have found that the fluorescent bodies concentrated in these pitches are soluble in petroleum oils, such as lubricating oils, and impart to the lubricating oil a green fluorescence, the strength of which depends upon the concentration of the fluorescent bodies. This process may be carried out in two broadly illustrative methods. The oil to which the desired fluorescence is to be imparted may be treated directly with the pitch or concentrate containing the fluorescent bodies and the resultant oil containing the desired amount of fluorescent material withdrawn. As an alternative method, a concentrated extract of fluorescent material may be made from the pitch, and this extract added in the required amount to the oil.

While pitches such as recited in the foregoing may be employed, we find it is desirable to utilize the pitches formed from petroleum oil available at the refinery. We have found that petroleum oils which give lubricating distillates having a bluish fluorescence will yield pitches which contain bodies which on solution in the oil will impart to the oil a green fluorescence. Thus on the distillation of an oil to produce lubricating oils, one may obtain blue fluorescent distillates with a consequent concentration of the green fluorescent bodies in the remaining bottoms. If one continues the distillation of these oils until the asphalts are obtained, it will be observed that the asphalts when treated with lubricating distillate which does not have a green fluorescence, will impart to this oil a very good green fluorescence. A further distillation of the asphalt will cause a further concentration of these fluorescent bodies. If the distillation is continued, it will be observed that the green fluorescent bodies come over with those overhead fractions formed in the regions of the coking temperatures of the oil. The fluorescence of the overhead becomes more and more green and less blue as the distillation is continued, until on reaching the highest boiling fractions the desired fluorescence is obtained. The above is true whether the original lubricating stock is obtained from a straight reduced crude or form a cracked residuum.

As a specific example of the manufacture of this pitch, the following may be given as an illustration. A lubricating stock made by the distillation of a crude, is reduced preferably in vacuum until 60 penetration asphalt is obtained. When this 60 penetration asphalt is extracted with oil, it will be observed that a green fluorescence is imparted to the oil which did not have this desired fluorescence at the start.

We have found, however, that if the distillation is continued until a 20 penetration asphalt is obtained, less of the asphalt is required to impart the same fluorescence to the oil, as would be required if the 60 penetration asphalt is employed. Furthermore, if the reduction of the asphalt is carried on until an asphalt of approximately 2 to 5 penetration is obtained, it will be observed that a further concentration of the fluorescent material has been effected, and less of the asphalt is required than in any of the former cases. If the reduction is carried further so as to coke the material, it will be observed that the overhead distillate thus obtained contains the fluorescent materials.

As stated, this fluorescent concentrate, or pitch, may be employed either directly or as an extract. The following examples are given as illustrative of this method of operating the invention:

Approximately 1 to 5% of the pitch heated to make the pitch fluid is introduced into the oil heated approximately to the temperature of the pitch. The mixture is commingled to form a uniform dispersion, such as for instance, by agitation. The undissolved residue is separated from the oil. The amount of pitch employed and the length of time of treatment will depend upon the concentration of the fluorescent material in the pitch and upon the strength of the fluorescence desired, and must be determined for each pitch and oil separately.

The oil may be acid treated before treatment with the pitch. In this case the oil is first acid treated and the acid sludge removed, and the acid-treated oil is then treated with the desired amount of pitch. The residue is withdrawn and the oil is treated with a neutralizing medium and with a decolorizing medium, if desired, or may be treated with a decolorizing and neutralizing medium such as clay, as is well known in the art.

Instead of using a melted pitch a finely ground and disintegrated pitch may be employed, as for instance, a pitch in the form of a 60 mesh powder. The process may be that described above, or the powdered pitch may be intermingled with the clay, and the acid-treated oil, after having the acid sludge removed, may be treated at an elevated temperature with the mixture. The temperature employed may be that usually employed in the treatment of oil with a neutralizing and decolorizing clay, for instance, at about 320° F. The purified oil with the required fluorescence is withdrawn.

Instead of treating the oil directly, a concentrated solution of the fluorescent bodies in a solvent may be first made, and the solvent intermingled with the oil to which the desired fluorescence is to be imparted. This solvent may be a volatile solvent, such as gasoline, benzol, or the like, or a higher boiling petroleum distillate, as for instance, a lubricating oil. When employing the volatile solvent, the extract is first made by commingling the pitch with the solvent, with the aid of heat if desired, the extract in required portion is added to the oil and the solvent removed by volatilization.

We have found it more desirable, however, to employ a higher boiling petroleum distillate, and particularly to employ a distillate which will not deleteriously affect the characteristics of the lubricating oil. We find it advisable to make a concentrated extract of the fluorescent material in the same oil as that which it is desired to treat. The extract is made in any of the manners described above. This concentrated extract may then be mixed with the main body of oil in the desired proportions to give the required fluorescence. The mixture may be made after the complete purification of above fractions, or may be made at any point in the purification step. We find it advisable to acid treat the oil, separating the acid sludge, extract the pitch with a portion of the oil to form a concentrated fluorescent solution, intermingle the oils in the required proportion and neutralize and decolorize the commingled oil.

The above description and the examples given are not to be taken as limiting our invention, but merely illustrative of the method employing the same, and of the preferred method of operating our invention which we claim.

We claim:

1. A process of imparting a desired green fluorescence to lubricating oil stock which does not contain the same, which comprises extracting fluorescent bodies from an uncracked petroleum oil pitch with the lubricating oil it is desired to treat, in quantities sufficient to impart to said oil the desired fluorescence, and then separating the oil containing the desired fluorescent bodies from the uncracked petroleum oil pitch.

2. A process of imparting a desired green fluorescence to lubricating oil stock which does not contain the same, which comprises commingling the oil with an uncracked petroleum oil pitch which contains fluorescent bodies in quantities sufficient to impart to said oil the desired fluorescence, and then separating the oil containing the desired fluorescent bodies from the petroleum oil pitch.

3. A process of imparting a desired green fluorescence to lubricating oil stock which does not contain the same, which comprises commingling the oil with an uncracked petroleum oil pitch which contains fluorescent bodies, at temperatures sufficient to extract from the petroleum oil pitch desired amounts of fluorescent bodies, and then separating the oil containing the desired fluorescent bodies from the petroleum oil pitch.

4. A process of imparting a desired green fluorescence to lubricating oil stock which does not contain the same, which comprises commingling the oil with an uncracked petroleum oil pitch made by distillation of a petroleum oil which contains fluorescent bodies, at temperatures sufficient to extract from the petroleum oil pitch desired amounts of fluorescent bodies, and then separating the oil containing the desired fluorescent bodies from the petroleum oil pitch.

5. A process of imparting a desired green fluorescence to lubricating oil stock which does not contain the same, which comprises commingling the oil with an uncracked petroleum oil pitch made by a vacuum distillation of a petroleum oil which contains fluorescent bodies, at temperatures sufficient to extract from the petroleum oil pitch desired amounts of fluorescent bodies, and then separating the oil containing the desired fluorescent bodies from the petroleum oil pitch.

JOHN C. BLACK.
WIRT D. RIAL.
JOHN R. McCONNELL.